United States Patent [19]

Sligter

[11] 4,183,198
[45] Jan. 15, 1980

[54] V-RAKE

[75] Inventor: Harm Sligter, Albany, Oreg.

[73] Assignee: Lely Pacific, Albany, Oreg.

[21] Appl. No.: 881,140

[22] Filed: Feb. 24, 1978

[51] Int. Cl.$^2$ ............................................. A01D 77/00
[52] U.S. Cl. ............................................................ 56/377
[58] Field of Search ................ 56/375, 376, 377, 365, 56/366

[56] References Cited

U.S. PATENT DOCUMENTS

| | | | |
|---|---|---|---|
| 2,603,053 | 7/1952 | Lipe et al. | 56/377 X |
| 2,683,345 | 7/1954 | Meyer | 56/377 |
| 2,993,328 | 7/1961 | van der Lely et al. | 56/377 |
| 3,145,522 | 8/1964 | Zink | 56/377 |
| 3,568,423 | 3/1971 | Hale et al. | 56/377 |

*Primary Examiner*—Russell R. Kinsey
*Attorney, Agent, or Firm*—Mason, Mason and Albright

[57] ABSTRACT

A raking device with a forward elongated rectangular or trapezoidal frame has coupling points that can be coupled to the three-point lift of a tractor. Two groups of rake wheels are pivoted to the frame and obliquely arranged in V formation, the point of the V being open and at the rear with respect to the direction of travel. The frame and beam members are normally positioned above the axles of rotation of the wheels so that windrows will not be disturbed until engaged by the rake wheels and moved to the center of the device. Each group of rake wheels can be adjusted along the length of the elongated frame and a further rake wheel can be attached to the rear of either group of wheels. Each group of wheels preferably includes two pairs of rake wheels that are mounted on respective yokes journalled to a respective group beam that is pivoted to the frame and spring suspended. The device can be operated at high speeds and the rake wheels can match ground irregularities.

12 Claims, 3 Drawing Figures

V-RAKE

The rake device disclosed herein is a high speed, highly maneuverable attachment that is designed to work windrows without disturbing the crop and bring the windrows to a single swath. The rake wheels are arranged obliquely and are pivoted to the attachment frame in pairs. The V-formation of the wheels can be adjusted with the addition of a further wheel or by shifting the wheels along the length of the frame.

Figure 1:
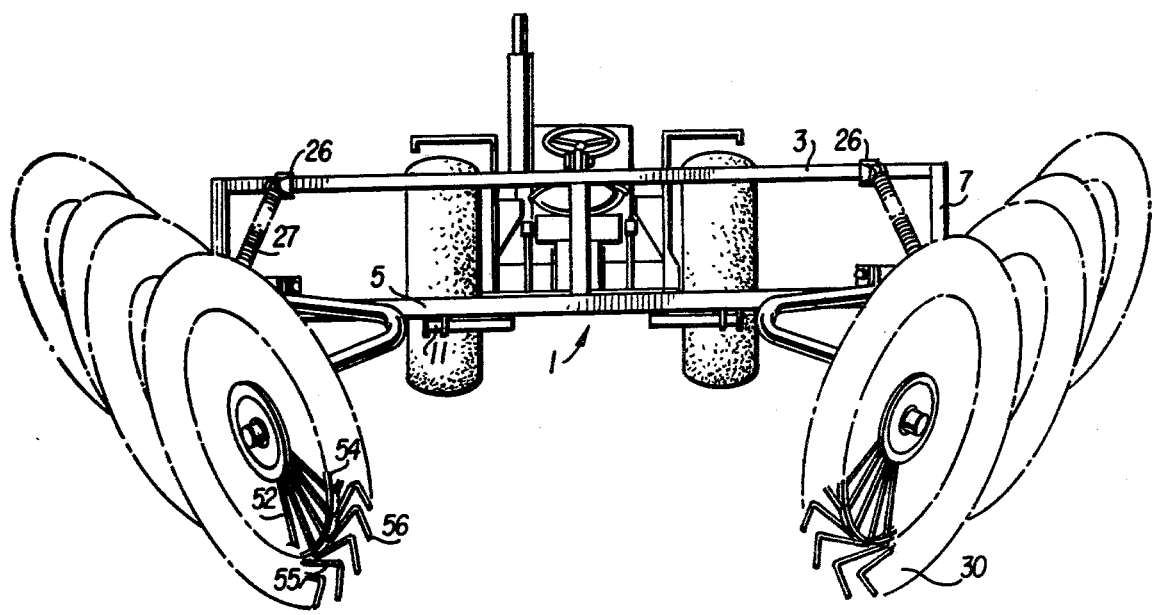
FIG. 1 is a rear elevation of the device.
Figure 3:
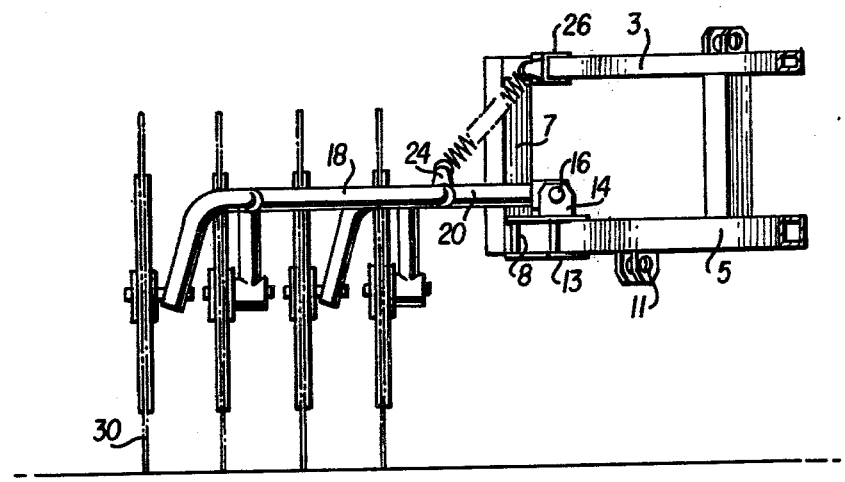
FIG. 3 is a side elevation of the device taken along the view 3—3 in FIG. 2.

An elongated hitch frame 1, preferably rectangular or trapezoidal in form, has long horizontal beams 3 and 5 and shorter side beams 7. The frame 1 is connectable to a conventional three point lifting hitch of a tractor with an upper coupling 9 and two couplings 11. Near each opposite end of lower beam 5 and adjacent the side beams 7, a pair of cheek plates 14 are secured on opposing plates 13 that are adjustably secured along the length of beam 5 with bolts 8. Respective groups of ground driven rake wheels 15 are pivotally connected to the plates 14 by pins 16.

Each group of rake wheels 15 includes a main beam 18 and a tubular bar 20 pivoted to the beam 18 extends forwardly to a coupling element 22 that fits within cheek plates 14. Apertures in elements 22 and plates 14 are aligned to receive the pins 16. A fastening 24 on bar 20 and an adjustable anchor tab 26 on beam 3 hold the ends of a tension spring 27 that resiliently supports each group 15 during operation.

Figure 2:
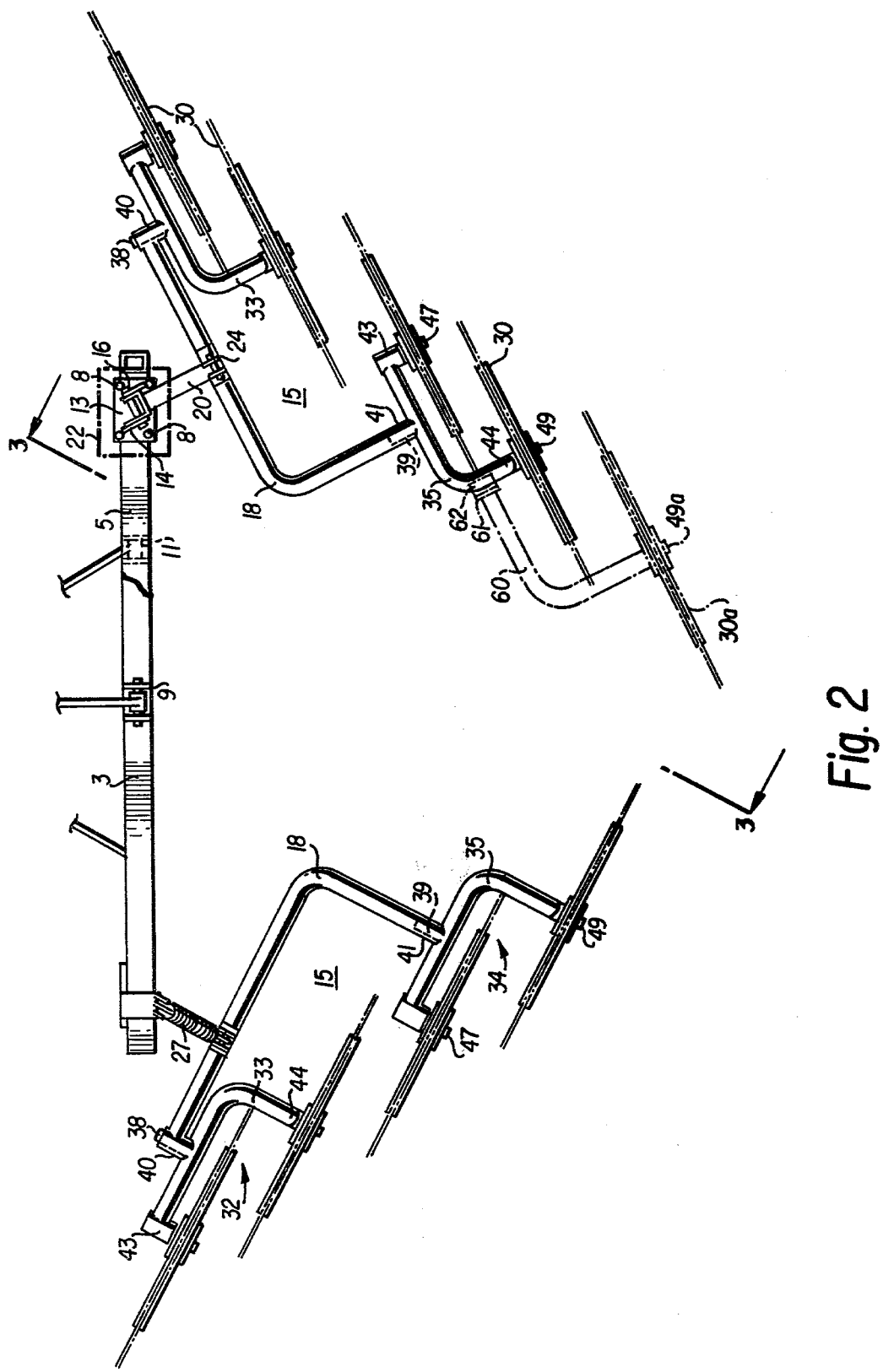
FIG. 2 is a plan view showing a further rake wheel attached to one group of rake wheels.

Each group 15 of rake wheels preferably mounts four rake wheel members 30 in pairs, including a forward pair 32 and a rearmost pair 34 as seen in FIG. 2 in the group 15 on the left side and in FIG. 1. The pairs of rake members 30 are mounted on yokes 33 and 35, respectively. Yokes 33 and 35 each have axles 38 and 39 that are journalled in bushings of front hub 40 and the end hub 41 of beam 18.

Similarly, each yoke 33 and 35, has a corresponding front hub 43 and a rear hub 45 that receive the axles 47 and 49 about which the wheels 30 turn. Each wheel member 30 has spokes 52 that extend radially out from a central disc passing through holes in felly 54 to form leg portions 55 and tines 56. Each group or row of rake wheels 15 can be adjusted along the length of beam 5 by loosening the bolts 8 and shifting the plates 13 to the desired location. Also, tabs 26 are moved along the length of beam 3.

The group of rake wheels 15 on the right side of the FIG. 2 implement has a fifth rake wheel member 30a releasably connected to the rear side of yoke 35 by a tubular beam 60. The beam 60 has a flange 61 that can be bolted to connecting plate 62 welded or otherwise affixed to the upper rear side of yoke 35 so that beam 60 is normally positioned above the axis of rotation of the fifth wheel 30a defined by axle 49a. Similarly, the yoke 35 of the FIG. 2 left side of the implement can be fitted to releasably receive a second beam 60 so that the rake member group 30 can have five rake members. The member 30a is the same as the other four members 30 and can be used to increase the working width of the implement and/or reduce the width of the swath being formed.

In the use of the implement, the frame 1 is connected to the three point lifting hitch of a tractor with upper coupling 9 and lower couplings 11. The groups of rake wheels 15 are positioned as shown in FIG. 1, the eight rake wheels 30 being arranged in two rows and in V formation with the point of the V being at the rear. In the FIG. 1 arrangement, the width of the implement shown is sufficient to rake two spaced apart windrows together into a single swath at high speed, the windrows passing to each side of the tractor and below the frame 1 substantially undisturbed. If it is desired to alter the width of the swath being worked by the FIG. 1 implement, a fifth wheel 30a can be connected as shown in FIG. 2 or to either group 15 or at both inner ends of groups 15.

Although specific examples and embodiments are disclosed herein, it is to be understood that no limitations are to be implied other than indicated in the appended claims.

What is claimed is:

1. A raking element comprising an elongated frame having multiple point coupling means connectable to a three point lifting hitch of a prime mover, two spaced apart rows of rake wheels being pivoted to said frame by corresponding pivots, said frame comprising elongated horizontal beam members extending substantially transverse to the direction of implement travel, said beam members being interconnected to one another and positioned one above the other, each row of rake wheels being connected to the frame with corresponding connection means that can be fixed in any one of a plurality of locations along the length of said beam members, said connection means including a lower pivot on one beam member and an upper resilient support connected to a further beam member, said rake wheels each being rotatable about a substantially horizontal respective axis that extends oblique to both the direction of travel and the longitudinal centerline of said frame.

2. An implement as claimed in claim 1, wherein said rows of rake wheels are arranged in V-formation and converge towards the rear, relative to the normal direction of travel, said rows being spaced apart leaving a single window opening between the rearmost rake wheels of said rows.

3. An implement as claimed in claim 2, wherein each row of rake wheels comprises two pairs of rake wheels that are turnable about corresponding substantially horizontal axles, the wheels of each pair being rotatable about respective axes.

4. An implement as claimed in claim 3, wherein each pair of rake wheels is mounted on a yoke that is journalled to a common beam, the beam of each row being connected to a lower beam member of said frame with respective bar means, said bar means being pivoted to said lower beam member and each row being displaceable upwardly and downwardly relative to the frame.

5. An implement as claimed in claim 1, wherein the axes of rotation of each rake wheel is located at a lower level than said beam members.

6. An implement as claimed in claim 4, wherein a further rake wheel is releaseably connected to at least one yoke adjacent the rear thereof and in front of an adjacent wheel, with respect to the normal direction of travel.

7. An implement as claimed in claim 6, wherein there are four rake wheels in one row and five rake wheels in the other row.

8. An implement as claimed in claim 4, wherein said frame is comprised by interconnected beam members that are arranged in rectangular form, the longer sides of the frame comprising an upper and a lower beam member that are positioned one above the other.

9. An implement as claimed in claim 8, wherein the front end of said bar means is pivoted on a connection to said lower beam member and a tension spring interconnects said upper beam member to said common beam.

10. An implement as claimed in claim 9, wherein the connection of each row of rake wheels to said lower beam member is adjustable along the length of that member.

11. An implement as claimed in claim 10, wherein a major portion of the common beam of each row of rake wheels has a longitudinal axis that normally extends obliquely transverse to the direction of travel, the yoke of each rake wheel pair being turnably mounted on respective axles that are journalled at the opposite ends of said beam.

12. An implement as claimed in claim 10, wherein said coupling means includes an upper coupling on said upper beam member and two lower couplings on said lower beam member of said frame.

* * * * *